US005659164A

United States Patent [19]
Schmid et al.

[11] Patent Number: 5,659,164
[45] Date of Patent: Aug. 19, 1997

[54] METHOD OF AND SYSTEM FOR APPARATUS FOR TWO-WAY AUTOMATICALLY CREATING, IDENTIFYING, ROUTING AND STORING DIGITALLY SCANNED DOCUMENTS

[76] Inventors: Edward Schmid, P.O. Box 1727, Meredith, N.H. 03253; Santosh Doss, 30 Marcellus Dr., Newton, Mass. 02159

[21] Appl. No.: 732,107

[22] Filed: Oct. 15, 1996

Related U.S. Application Data

[63] Continuation of Ser. No. 364,051, Dec. 23, 1994, abandoned, which is a continuation of Ser. No. 978,495, Nov. 5, 1992, abandoned.

[51] Int. Cl.[6] ............................................. G06F 17/00
[52] U.S. Cl. ............................................. 235/375; 382/317
[58] Field of Search ............................. 235/375; 358/403, 358/402, 452, 468, 467, 470; 382/61, 57, 317, 319, 321

[56] References Cited

U.S. PATENT DOCUMENTS

| | | |
|---|---|---|
| 4,283,621 | 8/1981 | Pembroke ............................ 235/375 |
| 5,051,779 | 9/1991 | Hikawa ................................ 235/437 |
| 5,109,439 | 4/1992 | Froessl ................................ 382/61 |
| 5,115,326 | 5/1992 | Burgess et al. ..................... 358/440 |
| 5,129,016 | 7/1992 | Murakami et al. ................. 358/403 |
| 5,161,037 | 11/1992 | Saito ................................. 358/468 |
| 5,227,893 | 7/1993 | Ett .................................... 358/403 |

OTHER PUBLICATIONS

"Document Imaging Systems: Technology Overview", Jun. 1980 Datapro Research (pp. 19–32).

*Primary Examiner*—Donald T. Hajec
*Assistant Examiner*—Jeffrey R. Filipek
*Attorney, Agent, or Firm*—Rines and Rines

[57] ABSTRACT

A novel method and system enabling a computer to identify the beginning and end of a logical group of digitally scanned pages, most commonly a multipage document, through the use of cover pages or sheets containing machine-readable information about where the document should be routed over a computer network, how to set scanning parameters in the scanner, and additional operations to perform, greatly increasing the efficiency and simplicity of creating, routing and processing scanned image documents without operator or user intervention and thereby enabling increased use of scanners in offices and the like.

23 Claims, 7 Drawing Sheets

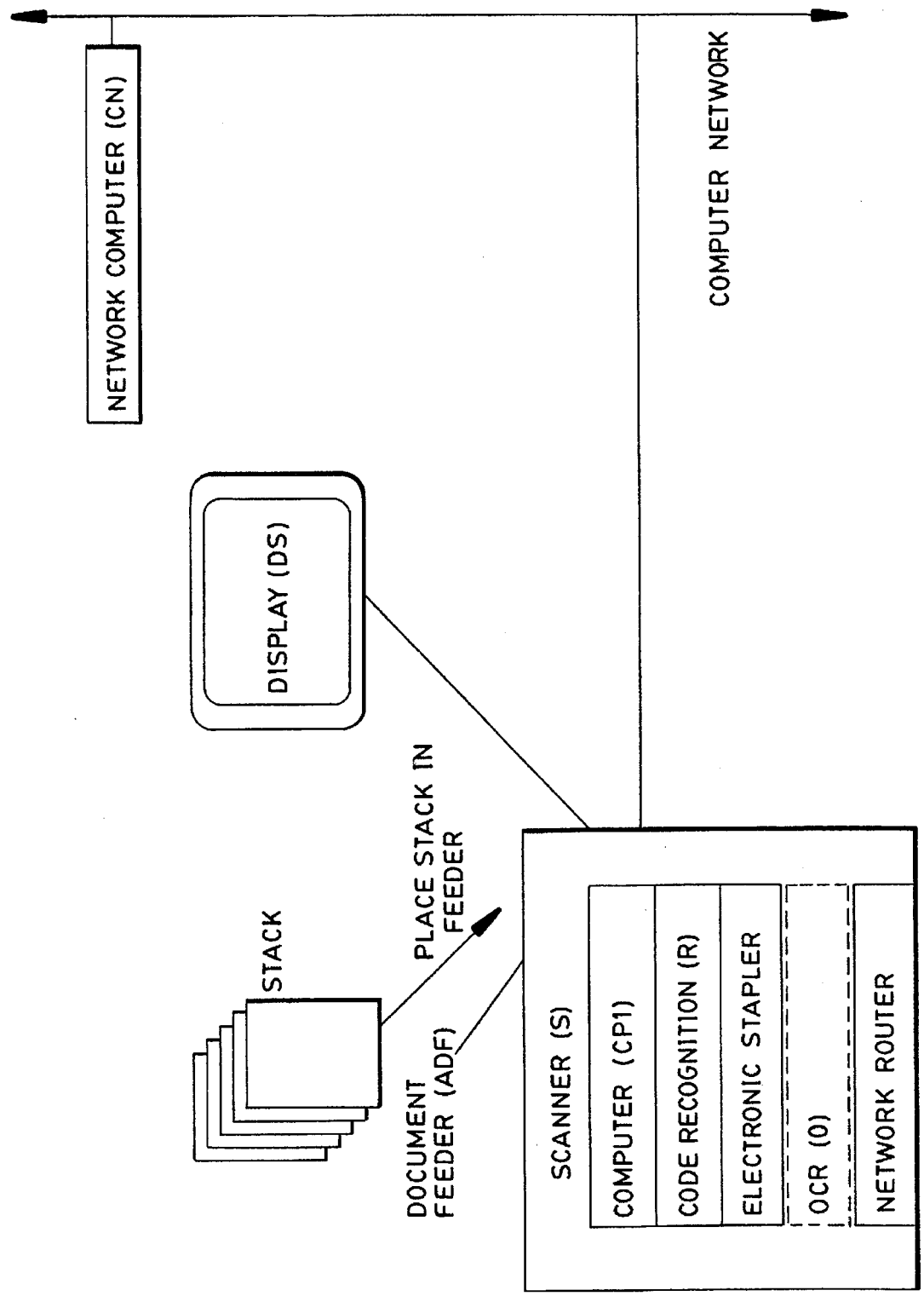

METHOD OF AND SYSTEM FOR APPARATUS FOR TWO-WAY AUTOMATICALLY CREATING, IDENTIFYING, ROUTING AND STORING DIGITALLY SCANNED DOCUMENTS

This application is a file-wrapper continuation of application Ser. No. 08/364,051, filed Dec. 23, 1994, now abandoned, in turn a continuation of Ser. No.07/978,495, filed Nov. 5, 1992, now abandoned.

The present invention relates to the digital scanning of documents comprising a plurality or stack of sheets or pages containing printed information, being more particularly concerned with the automatic identification of the beginning and ending of a logical group of pages during digital scanning, the identification and routing and storing of the digitally scanned sheets in a computer network, and the setting of parameters in the scanner and additional operations to be performed, all without the need for operator control or intervention.

BACKGROUND

Within recent years, computers have automated the process of creating documents in offices. Despite the explosive growth in such computer use for creating documents using word processors, spreadsheets or graphics programs, however, studies have shown that over 95% of information in offices still remains in paper form. In the mid 1980's, the first commercial systems were introduced that addressed this problem. They allowed paper documents to be digitally scanned and turned into a digital image of that document. These documents could then be stored on magnetic disks, sent over computer networks, printed to create copies and indexed for future retrieval with a database. They are commonly called document imaging systems, and a summary of the same is presented in "Document Imaging Systems: Technology Overview," June 1990, Datapro Research."

The creation of scanned documents using these systems is a laborious process, and several standard procedures are in use. One method is to scan a stack of sheets or pages and convert them to digitized images. This set of image pages can then be viewed on a computer display, one at a time, in the same order in which they were scanned. By paging through this batch, associated pages of a single document can be visually identified and electronically "stapled" or assembled together with appropriate software. Index information is often entered at this time into a database so that the document can later be searched for and retrieved.

A second method involves scanning one document at a time and using an automatic document feeder (ADF) to signal the end of the document through an out-of-paper condition, or through manual operator data entry at a keyboard, or by action with a pointing device. The start of a document is established by initiating the scanning process. Once again, index information is often entered into a database at this step.

A third method involves scanning one page at a time and displaying each digitized page on a computer screen, and enabling the operator to enter notation through the keyboard or a pointing device specifying the beginning and end of the document.

Should further processing of the document image information be required as by others in the organization, and the computer scanning station is connected to a computer network, the operator may also route this document to another individual on the network for such further processing. This activity may be added as the last step to all three above-described procedures.

Underlying the present invention, is the discovery of a more economical method of creating and routing the digitally scanned documents by eliminating the need for an operator during the scanning and routing, such also allowing for more ad hoc use of a scanner by all individuals in an office connected to the network. Whereas existing document imaging systems, as previously outlined, are used in applications involving repetitive handling of similar types of documents, the present invention opens up the use of scanners for random use in an office.

Specifically, the method of the invention involves the use of a cover page which contains both machine and human-readable information, but with machine-readable code information containing the network address or identifier for the individual to whom the documents should be assigned or routed, as well as settings for the scanner and/or additional operations to be performed, such as OCR (optical character recognition), and the like—all without the need for operator control or intervention. Stacks of paper containing printed information (where the term "printed" is intended generically to embrace all of type, handwritten, hand drawn, photographic or other information placed on the paper or sheet) are placed into the ADF at random for scanning. The only requirement is that each logical set of pages (normally a document) needs to be preceded by such a cover page containing the particular machine-readable information above specified. If it is such a cover page, it automatically extracts the machine-readable information from the digitized page, recognizes it and records the information. When a new cover page is detected or when the scanner ADF is empty, then the previous page becomes the last page of the document and all pages of the document are electronically "stapled" into a single identifiable entity which can be routed as specified by the machine-readable code and stored. When a user at a desktop computer opens the user's electronic inbox, each document is accordingly individually identified. Cover pages per se have, of course, been used in facsimile (FAX) and prior scanning systems and the like, but not in the manner or with the particular critical information and response thereto of the present invention.

In U.S. Pat. No. 190 5,129,016, issued Jul. 7, 1992, for example, a dover page is employed, including unique information for that particular document and involving the indexing of a document to a database. This is for the very different purpose of image registration for an image filing system. As such, accordingly, the system requires printing a specific cover page for each document and assuring such is used on the correct one. Such a technique, moreover, is prone to error and requires the additional steps of printing the cover pages, matching the unique cover page to a particular document, and then attaching the page. It also requires database information to be entered prior to the scanning process.

In many cases, furthermore, scanned documents are used for immediate communication, either by sending such out via computer FAX in an electronic mail system or to convert the document to editable text using an OCR process. There is, therefore, in such instances, no need to use an index page just for indexing the document as in said patent, because it will be used for a specific purpose and then deleted.

The present invention, with its quite different cover page purposes and operation, on the other hand, provides for great simplification of the scanning process for general office use by requiring only a single cover page for each user.

OBJECTS OF INVENTION

An object of the present invention, accordingly, is to provide a new and improved method of and system and apparatus for creating and routing digitally scanned documents that are significantly more economical and efficient than current techniques and enable elimination of the need for an operator during the scanning, routing and storing, and provide for increased potential use of scanners in offices and the like.

A further objective is to provide such an improved technique and apparatus through use of a novel cover page having machine-readable coded information that contains the network address or identifier for the document owners to whom the document should be assigned or routed, as well as settings for the scanner and/or additional operations to be performed, with electronic scanner-computer response to all such information.

Still a further object is to provide such a novel cover sheet and the scanner-computer supplemental facility to read and respond to the machine-readable information provided thereon.

Other and further objects will be described hereinafter and are delineated in the appended claims.

SUMMARY OF INVENTION

In summary, however, from one of its viewpoints, the invention embraces a method of automatically creating, identifying, routing and storing in a computer network, digitally scanned documents comprising a stack of sheets containing printed information, (where, as before stated, this term as used herein, embraces type, handwritten or drawn photographic or otherwise reproduced, or any other information carried by the sheet), that comprises, preparing a stack of successive sheets for digitalizing scanning; preceding the top sheet and all other logical sets of sheets within the stack with a cover sheet bearing machine-readable code markings containing identification of the document owner and desired routing of the digital information in the computer network; feeding the cover sheet(s) and stack of sheets into a digitizing scanner; during the scanning, recognizing the presence of the cover sheet and thus the beginning of the document scanning and reading the machine-readable code markings of the cover sheet and recording the identification-routing information thereof; upon the identification of a new cover sheet or the absence of further sheets fed to the scanner, identifying all sheets scanned from the previous cover page as a document and thereupon routing the digitized document information scanned therefrom in accordance with the recorded cover sheet identification-routing information; and storing the same in the computer network for subsequent retrieval or further processing.

Best mode and preferred designs and embodiments are hereinafter set forth.

DRAWINGS

The invention will now be described with reference to the accompanying drawings, FIG. 1 of which is an isometric view of successive stacks of document sheets provided with appropriate cover pages accordance with the invention;

FIGS. 2A and 2B schematic diagrams of digital scanner-ADF-computer interfacing, FIG. 2A employing computer-controlled machine-recognizing of the cover page code information externally of the scanner, and FIG. 2B illustrating such embedded with the scanner;

FIG. 2 C is a similar diagram illustrating further processing such as optical character recognition (OCR);

FIGS. 3A and 3B are flow or operational charts depicting steps in the practice of the invention, with the starred blocks requiring no user intervention; and FIG. 4 is a sample cover page.

DESCRIPTION OF PREFERRED EMBODIMENT (S) OF INVENTION

Figure 1:
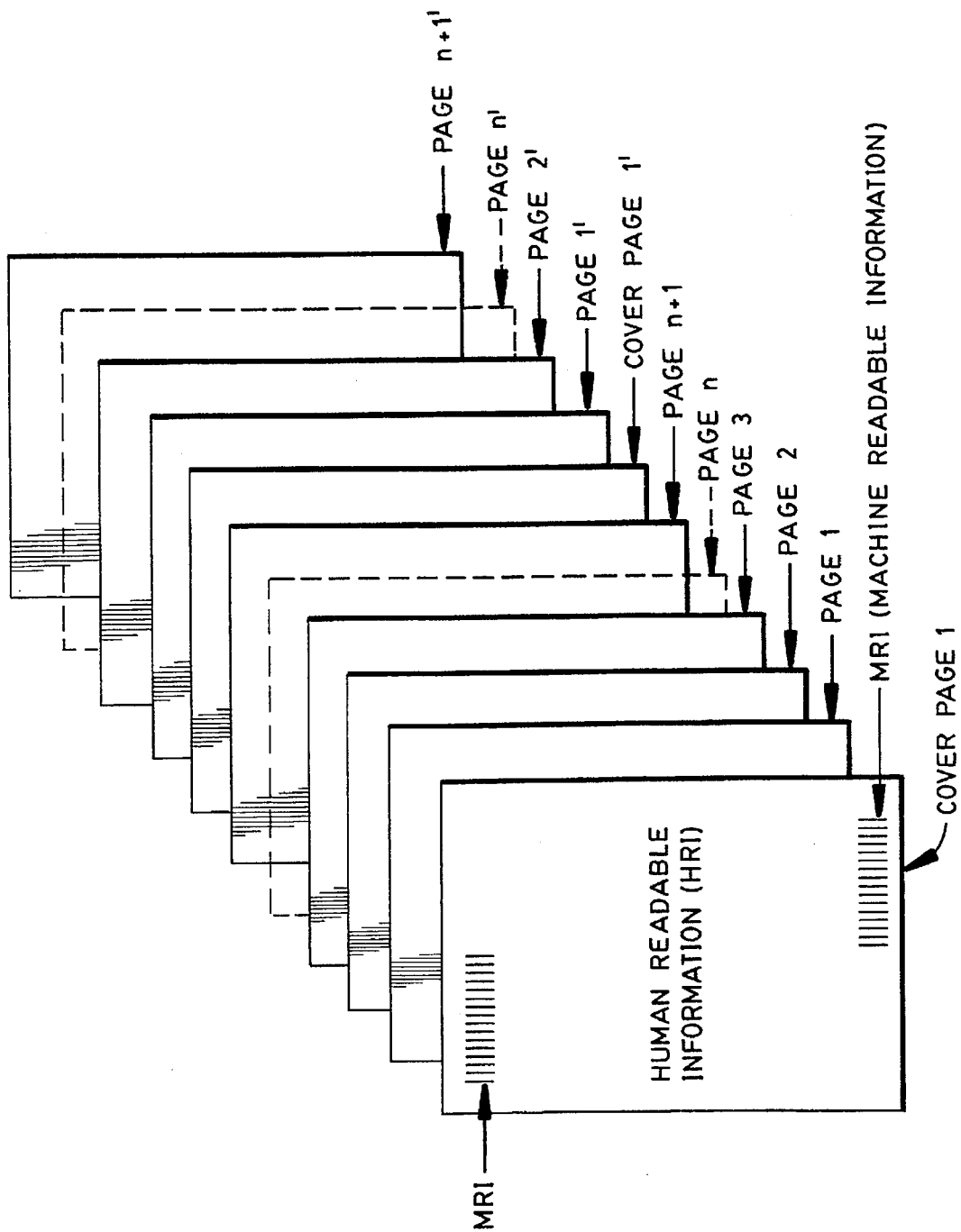

Turning now to FIG. 1, pluralities or stacks of sheets or pages, Pg. 1, Pg. 2, Pg. 3, etc.; Pg. $1^1$, Pg. $2^1$ etc., comprising the document(s) of printed information to be digitally scanned, routed and stored are shown provided with corresponding cover pages 1, $1^1$ containing the before-described machine-readable coded information MRI, as, for example, in preferred bar code format but also in any other suitable format, as desired. To accommodate for different scanning orientation in identifying the cover sheet and reading the coded MRI, the latter is preferably placed in opposite-side corners of the cover page, as shown in FIG. 1. For purposes of identification in assembly for the ADF, human-readable information may also be provided on the cover pages, as at HRI.

As earlier explained, in accordance with the present invention, the MRI, such as the bar-coded information on the cover page, contains the network address or identifier for the document owner to whom the document is assigned or is to be routed and, optimally, settings for the scanner S, FIGS. 2A and 2B, and/or additional operations, such as OCR and the like, later more fully explained. The scanner S is supplementarily equipped, either internally or by external equipment, with an apparatus MRI code reader R to identify during the scanning of the cover page 1, the fact that it is a cover page, and by computer program interfacing, externally at CP in FIG. 2A, or internally as embedded in the scanner at $CP^1$ in FIG. 2B, to respond by extracting the MRI from the scanned digital cover page, recognizing it and recording the information.

When a new cover page $1^1$ is encountered, or the scanner ADF is empty, the previous page (Pg. n+1) becomes the last page of the document and all pages (now in digital format) are electronically "stapled" or assembled into a single identifiable entity under the control of the programming CP (or $CP^1$) which is then routed and stored at CN. The document may then be further processed for retrieval, viewing, printing, etc. and further routing by the user.

Figure 3A:
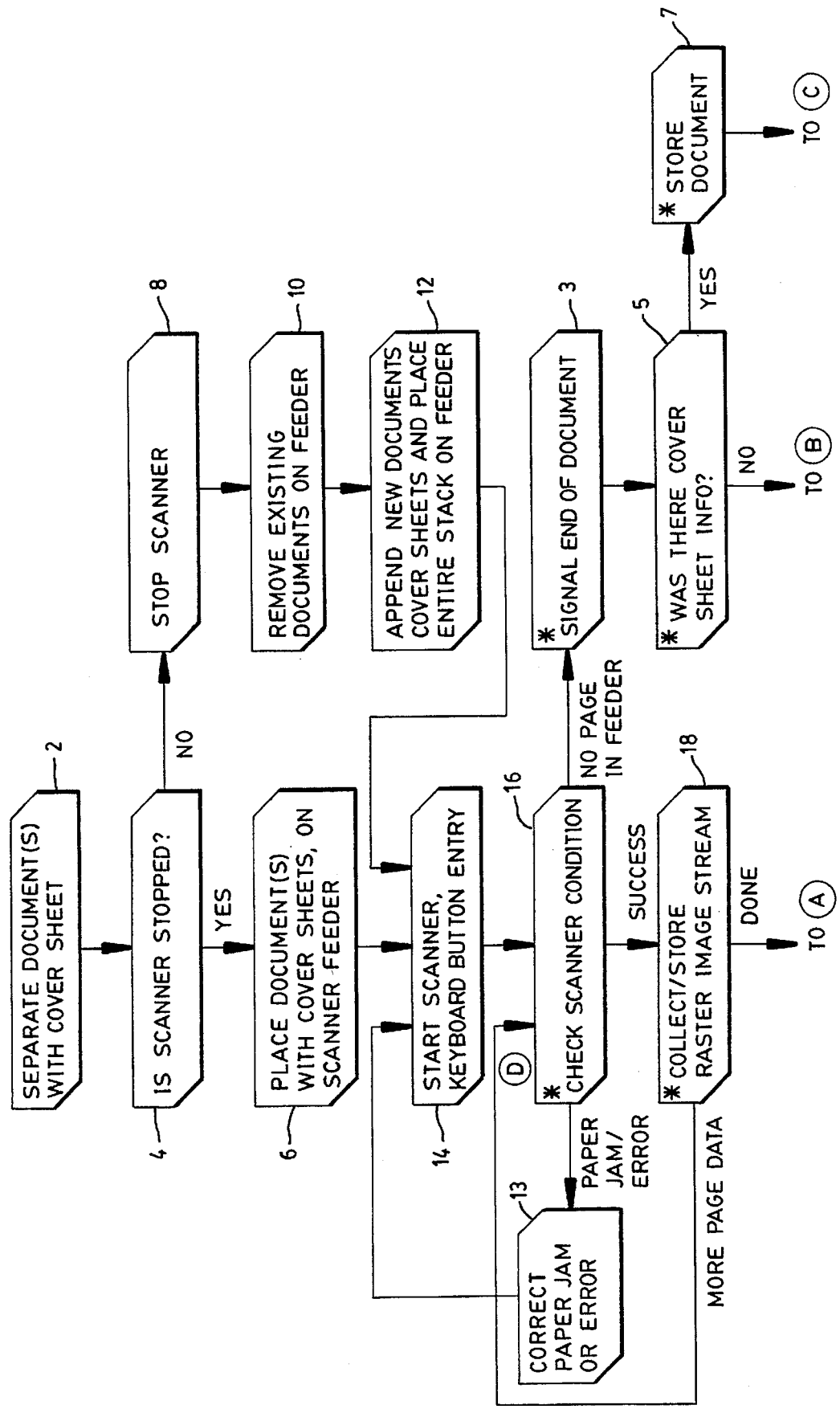
Figure 3B:
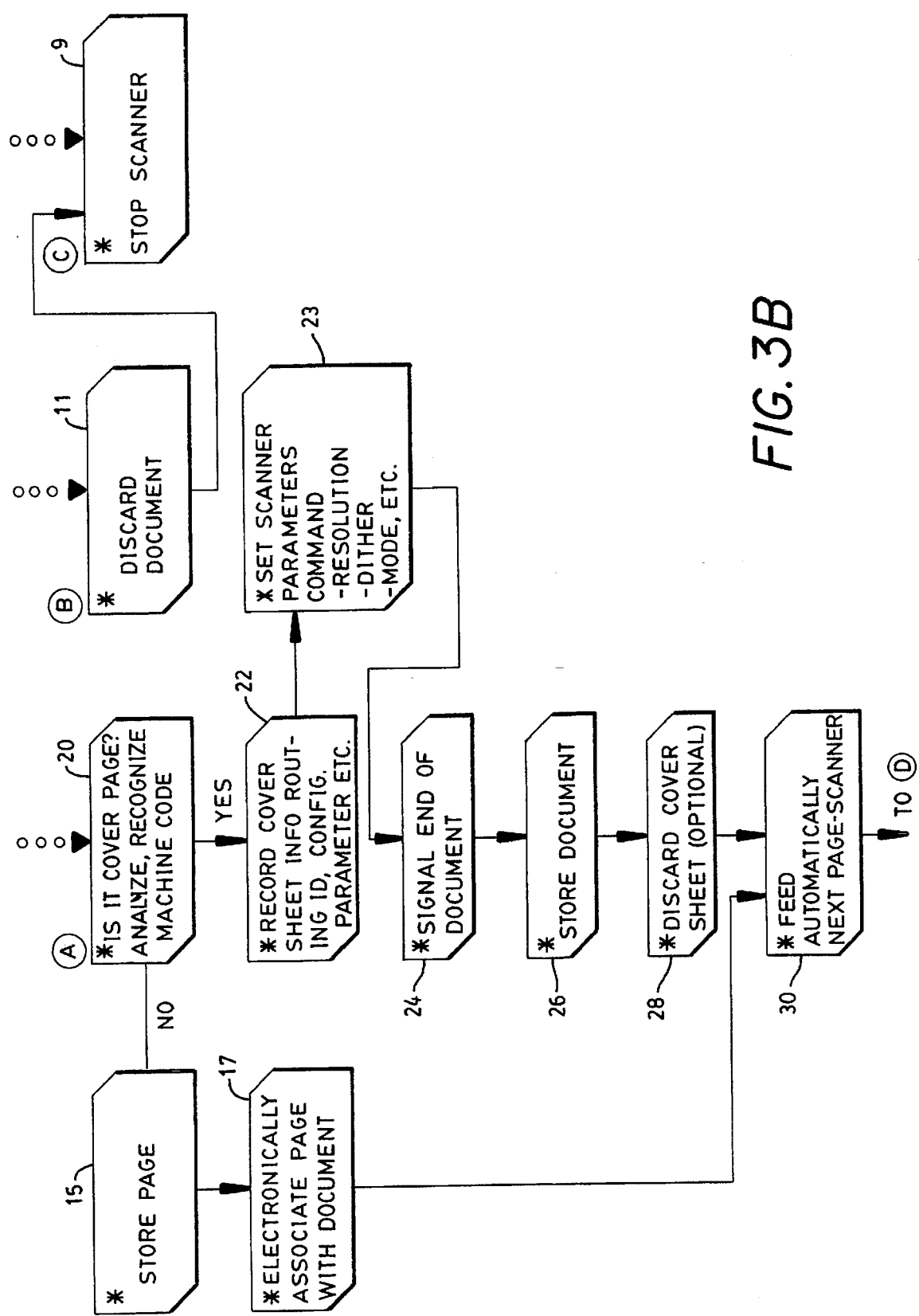

More specifically, referring to the flow charts of FIGS. 3A and 3B, such method of document separation and routing is shown commencing with the step of preparing or separating of the documents (s) with cover sheets in the top step block 2 of FIG. 3A. After ascertaining if the scanner is quiescent at 4 and placing the stacks at 6, FIG. 1, with appropriate cover sheets 1, $1^1$ on the scanner feeder ADF (and, if the scanner is not stopped, stopping the same at 8, removing existing documents on the ADF at 10, and appending new documents with cover sheets and stacking on the ADF at 12), the scanner S is started at 14 by keyboard entry or the use of a pointing device or mouse. If everything is in order at scanner condition check 16 and the digital data image data stream is collected and stored at 18, the digital data on the scanned cover page 1 is analyzed and the MRI read and recognized at 20, (box A, FIG. 3B), being then recorded at 22; i.e. the routing and scanner configuration interfacing, etc. parameters, including resolution, brightness, contrast, mode (color, grayscale or bitonal), dither, page size, scan region and the like.

Figure 4:
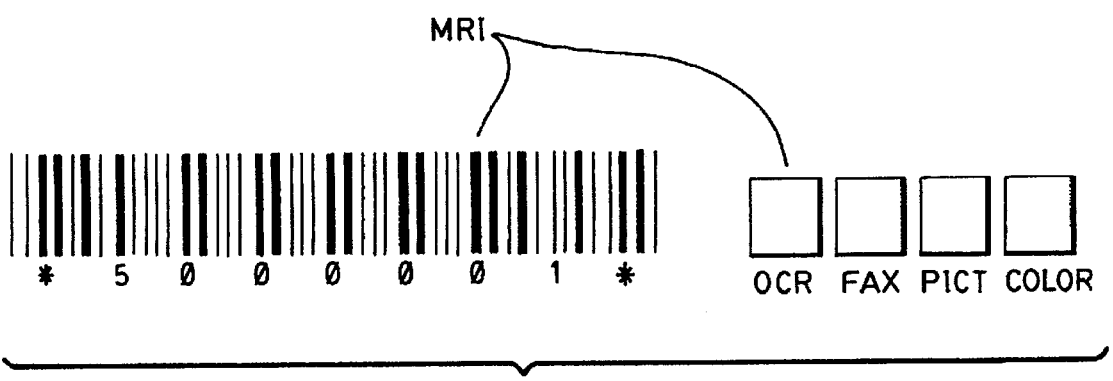

Referring to a sample cover page presented in FIG. 4, the bar code is shown followed by user-selectable boxes the marking of which indicates to the MRI reader, scan parameter settings ("FAX—resolution setting; "PICT—dither setting; and "COLOR"—mode setting), and whether there is to be further OCR (or other) processing.

Figure 2A:
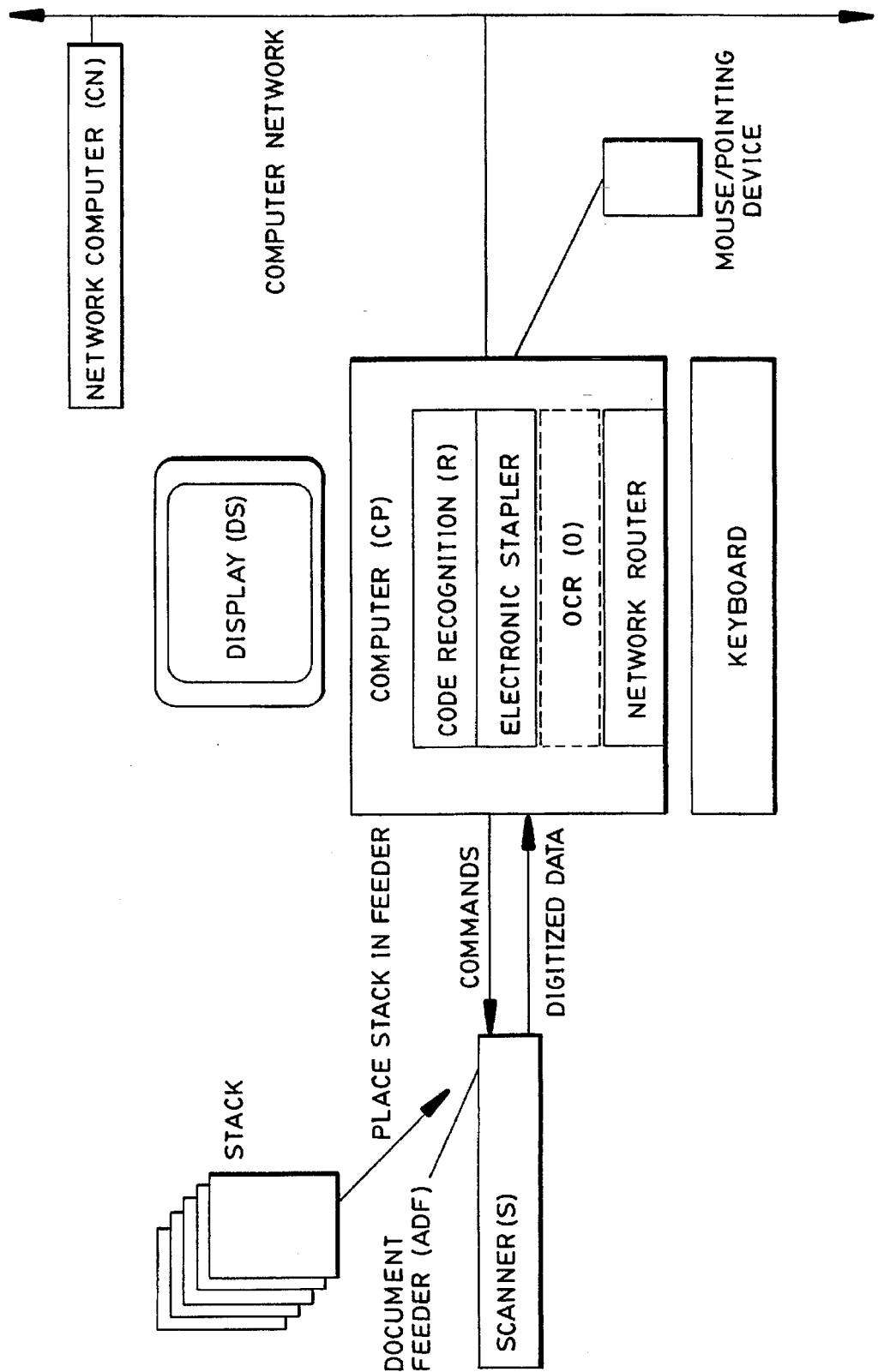
Figure 2C:
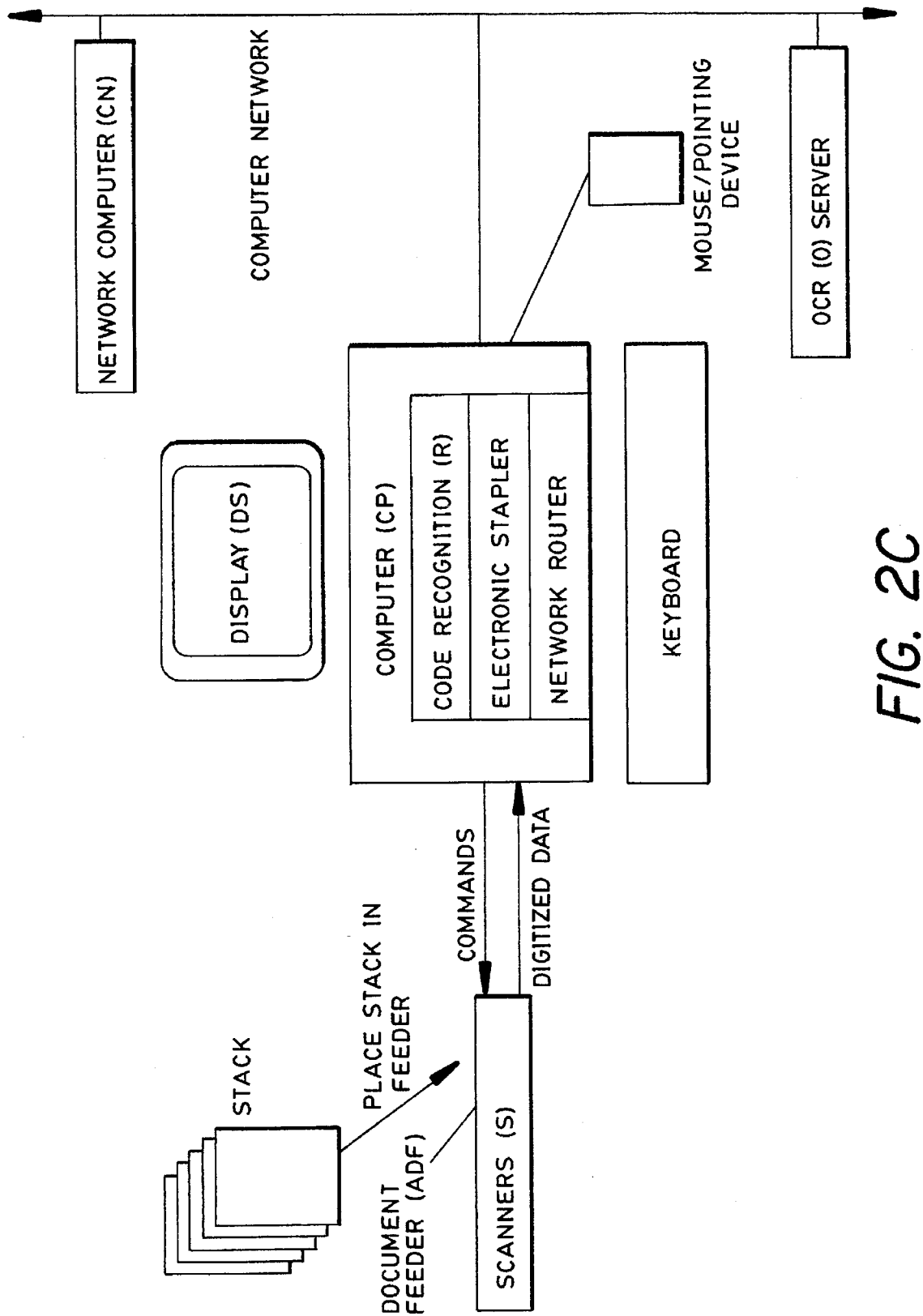

Such an OCR operation is shown in FIG. 2C where, if the MRI contains an OCR processing request ("OCR" box checked in FIG. 4), the computer CP routes the documents to the OCR server O, where the digitized image data stream is converted to textural information and routed to network CN.

As more particularly detailed in the flow diagram of FIG. 3B, the reading of MRI-scanner parameter setting information at 22 provides appropriate setting commands at 23 to the scanner S ("commands" in FIGS. 2A and 2C) or through internal setting (FIG. 2B), which is the before-mentioned resolution, dither, mode, etc.

Should more page data be required at 18, such is accommodated and the check at 16 repeated. Should no cover page be indicated at 20, however, the digitally scanned page information will be stored at 15 and electronically associated with the document 17 and then applied in the next page scanning at 30, FIG. 3B.

Upon the conclusion of the scanning of the document (Pg. n+1, FIG. 1) at 24, and the advent of the next cover page $1^1$ (or empty ADF), the document, appropriately routed is stored in the network at 26, and, if desired, the cover sheet data may be discarded, as at 28. The next page scanning commences at 30 as the next document ($1^1$), Pg. $1^1$, Pg. $2^1$, FIG. 1) is automatically fed at the ADF. The operation then returns at D to step 16, FIG. 3A.

If, however, during the scanner condition check at 16, there is no longer a sheet or page in the ADF, an end-of-document signal is generated at 3. If there had been a cover sheet with its MRI information in the preceding scanner operation at 5, indicating, for example, that a proper document such as in FIG. 1 had been digitized by the scanner, the digitized pages are collected or "stapled" and stored as the digitized document at 7 and at the cover-page-directed routed address or owner's identification. The scanner is then stopped at C and 9, FIG. 3B.

On the other hand, if there was no scanned cover sheet at 5, FIG. 3A, the document is discarded (B and $1^1$, FIG. 3B) and the scanner stopped at 9 and/or error notification is sent to the system administrator over the network.

For purposes of visualization of the operation of the scanner and that the parameters are correct, a display monitor D5 may be provided as shown in FIGS. 2A, B and C.

Returning to FIG. 3A, if, during the scanner condition check at 16 there had been a paper jam or error, such would be indicated for correction at 13, and then a new start initiated at 14.

A prototype of the invention has been successfully operated with a Hewlett-Packard ScanJet IIp scanner, with an ADF connected to an IBM PC AT compatible computer which controlled the scanner operation and performed the recognition of the machine-readable code with an application running under Microsoft Windows. This machine was connected to a Novell NetWare 386 network over which the documents were routed. For the prototype, Code 39 Barcode was used at 36 points for the machine-readable code. It was placed starting at 1¼ inch from the top and left edges of the paper. In addition, human-readable information was placed in the center of the cover page so that the user can easily identify the owner of the cover pages, providing individual names as well as information and inventories about specific scanning parameters.

Some of the important features of the invention can be accomplished by attaching or adding to the first document page or sheet, the MRI coded information; or similarly to the end of the last sheet, or on a backing sheet.

Further modifications will also occur to those skilled in this art and are considered to fall within the spirit and scope of the invention as defined in the appended claims.

What is claimed is:

1. A method of digitally scanning information-containing sheets using cover sheets both for creating separated documents comprised of predetermined pluralities of sheets, with the presence and/or absence of such cover sheets identifying the first and last sheets of each document, and for routing the scanned document information to a computer-network user whose identification in machine-readable code is contained on the cover sheet and is read during the document scanning, the method comprising, preparing a stack of successive sheets to constitute one or more documents for digitalizing scanning; preceding the top sheet and all other logical sets of sheets within the stack that is to constitute a document with a cover sheet bearing machine-readable code markings containing identification of the said user and desired routing of the digital information in the computer network directly to said user upon the document scanning; feeding the cover sheet(s) and the stack(s) of sheets into a digitalizing scanner; upon the start of the scanning, recognizing the presence of the cover sheet and thus the beginning of the document-to-be-scanned, and thereupon reading the machine-readable code markings of the cover sheet and recording the identification-routing information thereof, thus effectively discarding the cover sheet; upon the identification of a new cover sheet or the absence of further sheets fed to the scanner, identifying all sheets scanned from the previous cover sheet as a document, and thereupon routing the digitized document information scanned therefrom in accordance with the recorded cover sheet identification-routing information directly to said user; and storing the same in a directory to said user for subsequent retrieval or further processing.

2. A method as claimed in claim 1 and in which the machine-readable code markings contain also scanner parameter information including resolution and brightness adapted for the nature of the information on the sheets; and responding to the reading thereof appropriately to set the scanner parameters during the digitizing scanning.

3. A method as claimed in claim 2 and in which the machine-readable code markings additionally contain further operational image processing instructions including for optical character recognition.

4. A method as claimed in claim 2 and in which, in the event that the presence of a cover sheet is not recognized during the scanning, the document is discarded and/or an error message is sent.

5. A method as claimed in claim 1 and in which the cover sheet is also provided with human-readable identification information containing machine-readable routing information.

6. A method as claimed in claim 1 and in which the machine-readable code markings are in bar code format.

7. For use with a digitizing scanner, a method of automatically routing to any identifiable computer network user under the control of a cover sheet containing such user's identification in machine-readable code documents separated by such cover sheet, comprising a stack of sheets containing information-to-be-scanned and digitized, that comprises, preceding the top sheet and all other logical sets of sheets within the stack with a cover sheet bearing machine-readable code markings containing identification of the said user and desired routing of the digitized information in the computer network directly to said user, and scanner parameter information; feeding the cover sheet and stack of sheets of the document into said digitizing scanner; recognizing the presence of the cover sheet at the beginning of the scanning and reading its machine-readable code markings; recording the identification-routing information read from the cover sheet code marking while effectively discarding the cover sheet; responding to the cover sheet code markings containing said scanner parameter information to set the scanner with said parameters; upon the identification of a new cover sheet or the absence of further sheets fed to the scanner, identifying all sheets scanned from the previous cover sheet as a document, and thereupon routing the scanned and digitized document information in accordance with the recorded cover sheet identification-routing information directly to said user; and storing the same in a directory of said user.

8. A method as claimed in claim 7 and in which the recognizing recording, responding and routing steps are performed by computer processing interfacing with the scanner.

9. A method as claimed in claim 8 and in which the computer processing is effected externally of the scanner between the scanner and the computer network.

10. A method as claimed in claim 8 and in which the computer processing is embedded within the scanner.

11. A method as claimed in claim 8 and in which the machine-readable code markings are in bar-code format, and the scanner is provided with bar-code reading and recognizing capability.

12. In a digitizing scanner system for documents comprising a stack of sheets containing printed information to-be-digitized, apparatus for automatically routing to any indentifiable computer network user under the control of a cover sheet containing such user's identification in machine-readable code scanned document information in digitized form, having, in combination with a digitizing scanner, means for feeding to the scanner the successive logical sets of sheets of the stack each preceded by a cover sheet bearing machine-readable code markings containing identification of the said user and desired routing of the digitized information in the computer network directly to said user; means connected with the scanner for recognizing the presence of the cover sheet at the beginning of the scanning and reading its machine-readable code markings while effectively discarding the cover sheet; and means operative upon identification of a new cover sheet or the absence of further sheets at the scanner, for identifying all sheets scanned from the previous cover as a document; means responsive to the last-named means for thereupon collecting and routing the scanned end digitized document information in accordance with the recorded cover sheet identification-routing information directly to said user; and means for storing the same in a directory of said user.

13. Apparatus as claimed in claim 12 and in which the cover sheet is provided with further machine-readable code markings containing scanner parameter setting information; and the scanner is provided with means for reading and responding to the further code markings to set the scanner with those parameters for the scanning of the sheets of the stack.

14. Apparatus as claimed in claim 13 and in which the further machine-readable code markings also include other operational instructions including optical recognition functions.

15. Apparatus as claimed in claim 13 and in which the machine-readable code markings are in bar-code format and the scanner is provided with corresponding bar-code reading and recognizing means.

16. Apparatus as claimed in claim 13 and in which human-readable information is provided on the cover sheet corresponding to at least one of the same document owner and the same scanner parameter setting information contained in the machine-readable code markings.

17. Apparatus as claimed in claim 12 and in which the recognizing, recording, indicating, collecting and routing means are controlled by computer processing means interfacing with the scanner.

18. Apparatus as claimed in claim 17 and in which the computer processing means is disposed externally of the scanner between the same and the computer network.

19. Apparatus as claimed in claim 17 and in which the computer processing means is embedded within the scanner.

20. For use with a document-digitizing scanner connected with a computer network, a document cover sheet bearing machine-readable code markings containing identification of the user and desired routing of the digitized document in the computer network for recognition and reading by and routing from the scanner directly to said user said recognition and reading being performed when the document cover sheet is scanned.

21. A document cover sheet as claimed in claim 20 and in which the machine-readable markings further contain scanner parameter setting information for response thereto by the scanner as it scans the document.

22. A document cover sheet as claimed in claimed in claim 20 and in which the machine-readable code markings are displayed on opposite-side corners of the cover sheet.

23. A document cover sheet as claimed in claim 21 and in which human-readable information is provided on the cover sheet corresponding to at least one of the same document owner information and the same scanner parameter setting information contained in the said machine-readable code markings.

* * * * *